United States Patent [19]

Tanaka et al.

[11] Patent Number: 5,760,831
[45] Date of Patent: Jun. 2, 1998

[54] IMAGE PROCESSING APPARATUS WITH WHITE BALANCE CONTROL

[75] Inventors: Yasuyuki Tanaka, Tokyo; Osamu Ueda, Kawasaki; Norihiro Kawahara, Tokyo, all of Japan

[73] Assignee: Canon Kabushiki Kaisha, Tokyo, Japan

[21] Appl. No.: 524,963

[22] Filed: Sep. 8, 1995

Related U.S. Application Data

[63] Continuation of Ser. No. 111,639, Aug. 25, 1993, abandoned.

[30] Foreign Application Priority Data

| Aug. 28, 1992 | [JP] | Japan | 4-253989 |
| Aug. 31, 1992 | [JP] | Japan | 4-255673 |
| Dec. 24, 1992 | [JP] | Japan | 4-357631 |

[51] Int. Cl.$^6$ .................................................. H04N 9/23
[52] U.S. Cl. ........................ 348/223; 348/225; 348/656
[58] Field of Search .............................. 348/223, 225, 348/656, 257, 258, 655; H04N 9/23

[56] References Cited

U.S. PATENT DOCUMENTS

| 5,040,054 | 8/1991 | Schmidt et al. | 358/29 |
| 5,223,921 | 6/1993 | Haruki et al. | 358/29 |
| 5,267,026 | 11/1993 | Kawahara et al. | 358/29 |
| 5,270,802 | 12/1993 | Takagi et al. | 358/29 |
| 5,274,440 | 12/1993 | Miyazaki | 358/29 |
| 5,361,093 | 11/1994 | Yamamoto et al. | 348/223 |

FOREIGN PATENT DOCUMENTS

| 6229296 | 7/1987 | Japan | H04N 9/73 |
| 50592 | 2/1990 | Japan | H04N 9/73 |
| 250489 | 8/1990 | Japan | H04N 9/73 |
| 433672 | 6/1991 | Japan | H04N 9/73 |
| 3259692 | 11/1991 | Japan | H04N 9/73 |
| 289793 | 12/1991 | Japan | H04N 9/73 |

*Primary Examiner*—Glenton B. Burgess
*Attorney, Agent, or Firm*—Morgan & Finnegan, LLP

[57] ABSTRACT

An image processing apparatus comprises a coefficient generation circuit for generating a coefficient such as to decrease as a level of a luminance signal which is obtained by processing an input image signal increases while exceeding a predetermined limit value and to decrease as the luminance signal level decreases to a value lower than a predetermined lower limit value, a multiplier for multiplying a color difference signal which is obtained by processing the input image signal and the coefficient generated from the coefficient generation circuit, an integrating circuit for integrating the multiplication output from the multiplier into a plurality of predetermined regions on a screen, and a white balance control circuit to control the white balance of the screen by using the integration output of the integrating circuit.

4 Claims, 12 Drawing Sheets

IMAGE PROCESSING APPARATUS WITH WHITE BALANCE CONTROL

This is a continuation of application Ser. No. 08/111,639, filed on Aug. 25, 1993 now abandoned.

BACKGROUND OF THE INVENTION

1. Field of the Invention

The invention relates to an image processing apparatus which is used in a video camera or the like.

2. Related Background Art

Figure 1:
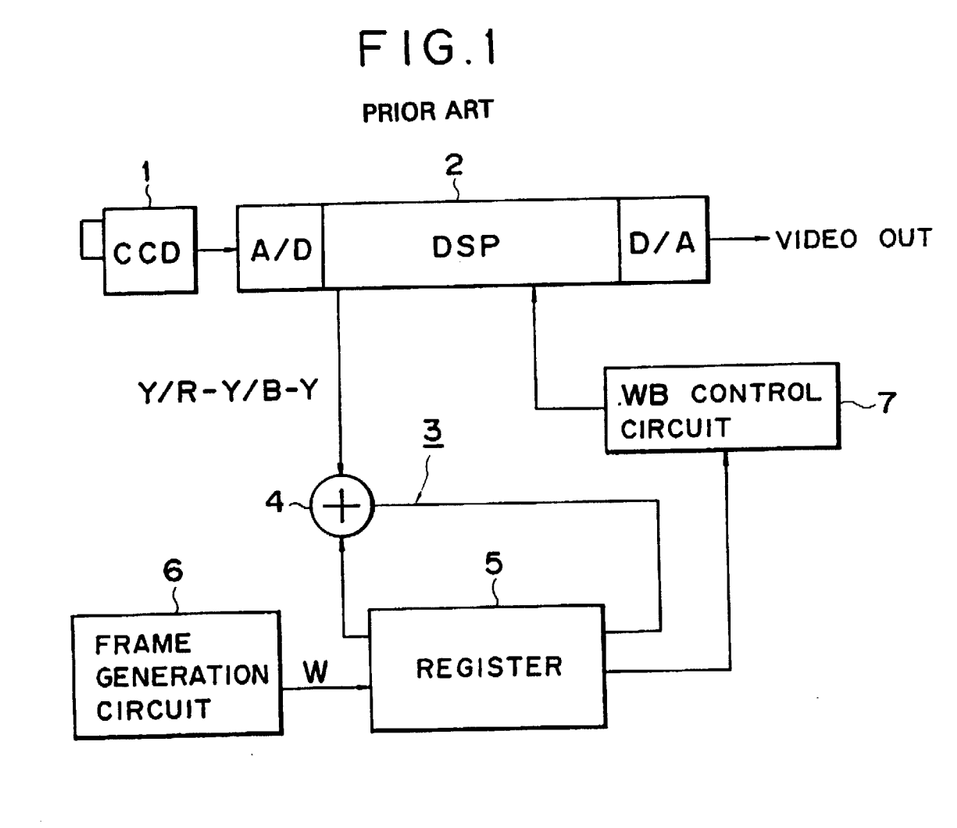
FIG. 1 is a constructional diagram of a conventional white balance control apparatus.

FIG. 1 shows an image processing apparatus such as a white balance control apparatus in a conventional video camera. In FIG. 1, reference numeral 1 denotes a CCD as an image pickup device; 2 a digital image signal processor (hereinafter, referred to as a DSP) to process an image signal which is derived from the CCD 1; and 3 a digital integrating circuit for respectively integrating a luminance signal Y and color difference signals R-Y and B-Y from the DSP 2. The digital integrating circuit 3 is constructed by an adder 4 and a register 5.

Reference numeral 6 denotes a frame generation circuit to generate a frame signal W indicative of an integrating region of the integrating circuit 3, and 7 indicates a white balance control circuit to control the white balance of the DSP 2 on the basis of an integration value of the integrating circuit 3.

Although only one integrating circuit 3 is shown in the diagram, it is assumed that three integrating circuits 3 are provided for the signals Y, R-Y, and B-Y.

FIGS. 2A to 2D show photographed picture planes 8 obtained by the CCD 1. Reference numeral 9 denotes a frame derived by dividing the picture plane 8, and 9a indicates a frame of a high luminance, which will be explained hereinlater.

The operation will now be described. The image signal obtained from the CCD 1 is supplied to the DSP 2 and is A/D converted. The converted digital signal is subjected to a predetermined signal process. The processed signal is D/A converted into the analog signal and is generated as a video signal.

Each of the signals Y, R-Y, and B-Y which are obtained during the processes in the DSP 2 are digitally integrated by the integrating circuit 3. In this instance, each of those signals is integrated every frame 9 shown in, for example, FIG. 2B by a frame signal W which is generated from the frame generation circuit 6. The white balance control circuit 7 controls the white balance for the DSP 2 by using the integration data which is obtained every frame 9.

Figure 2A:
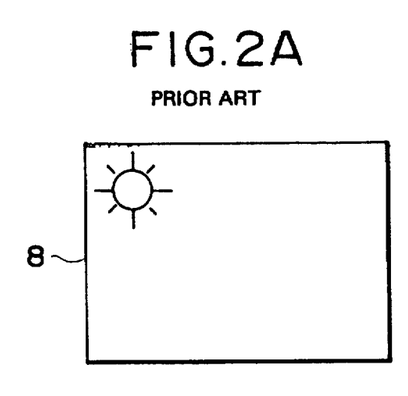
FIGS. 2A to 2D are constructional diagrams for explaining frames of picture planes.
Figure 2B:
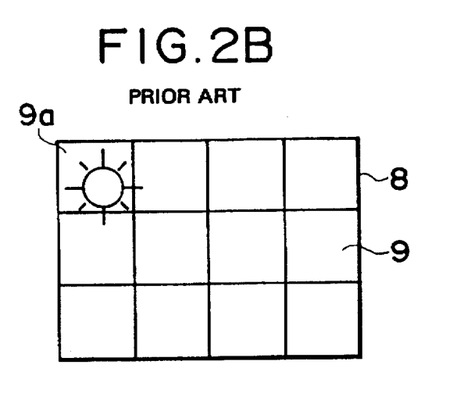

When the above integration data is used, the white balance (WB) control circuit 7 eliminates the portion which is improper for the white balance control in the photographed picture plane 8 in FIG. 2A. For example, the WB control circuit 7 eliminates the integration data which is derived from the frame 9a whose luminance is high and whose color is skipped in FIG. 2B. Thus, the white balance control of a high luminance can be executed.

Figure 2C:
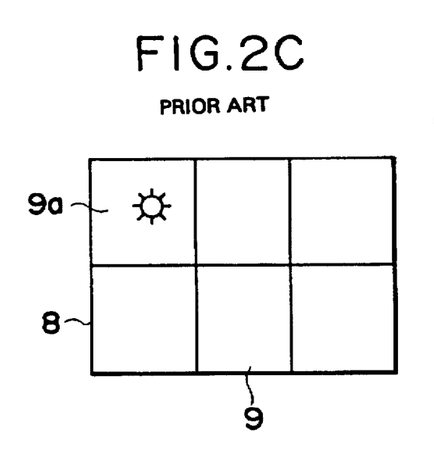
Figure 2D:
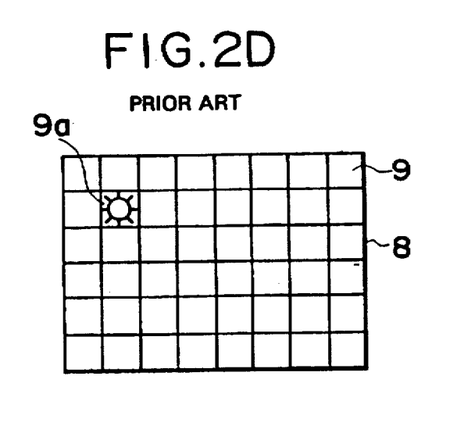

Since the conventional white balance control apparatus is constructed as mentioned above, when the size of frame 9 is too large in case of eliminating the improper portion such as a high liminance portion or the like from the picture plane, a portion to be eliminated is excessively large, so that the accurate data cannot be detected. On the contrary, when the size of frame 9 is too small, it takes a long time to collect data. For example, when the frame 9 is large as shown in FIG. 2C, even if a small high luminance portion exists in the frame 9a, the whole region of the frame 9a becomes a target for elimination. On the other hand, when the frame 9 is small as shown in FIG. 2D, even if the frame 9a is eliminated, the luminance is not so deteriorated. However, it takes a long time to collect the data of one picture plane.

SUMMARY OF THE INVENTION

The present invention is made to solve the above problems and it is an object of the invention to provide a white balance control apparatus which can collect correct data without reducing a frame.

Figure 4:
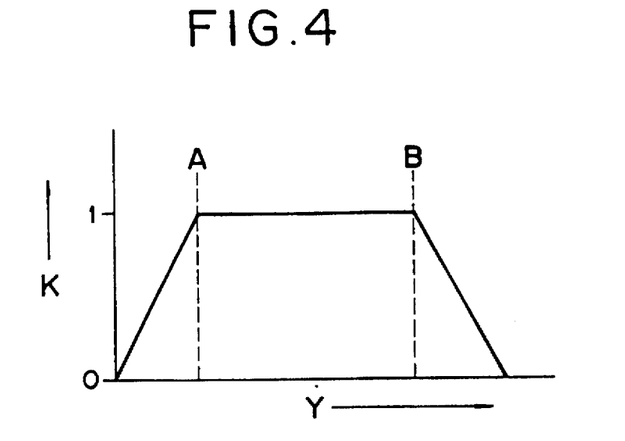
FIG. 4 is a characteristic diagram showing the relation between the luminance signal and the coefficient.

According to the invention, there is provided a white balance control apparatus comprising:
coefficient generating means for generating a coefficient K as shown in FIG. 4 in accordance with a luminance signal Y; multiplying means for multiplying the coefficient and a color difference signal; and integrating means for integrating the multiplication value every frame.

According to the above embodiment, a ratio of information in a portion such as high luminance portion, low luminance portion, or the like in which the color component cannot be normally detected is small and the accurate data can be collected without reducing the size of frame to a size than it is needed.

The above and other object and features of the present invention will become apparent from the following detailed description and the appended claims with reference to the accompanying drawings.

DETAILED DESCRIPTION OF THE PREFERRED EMBODIMENTS

Figure 3:
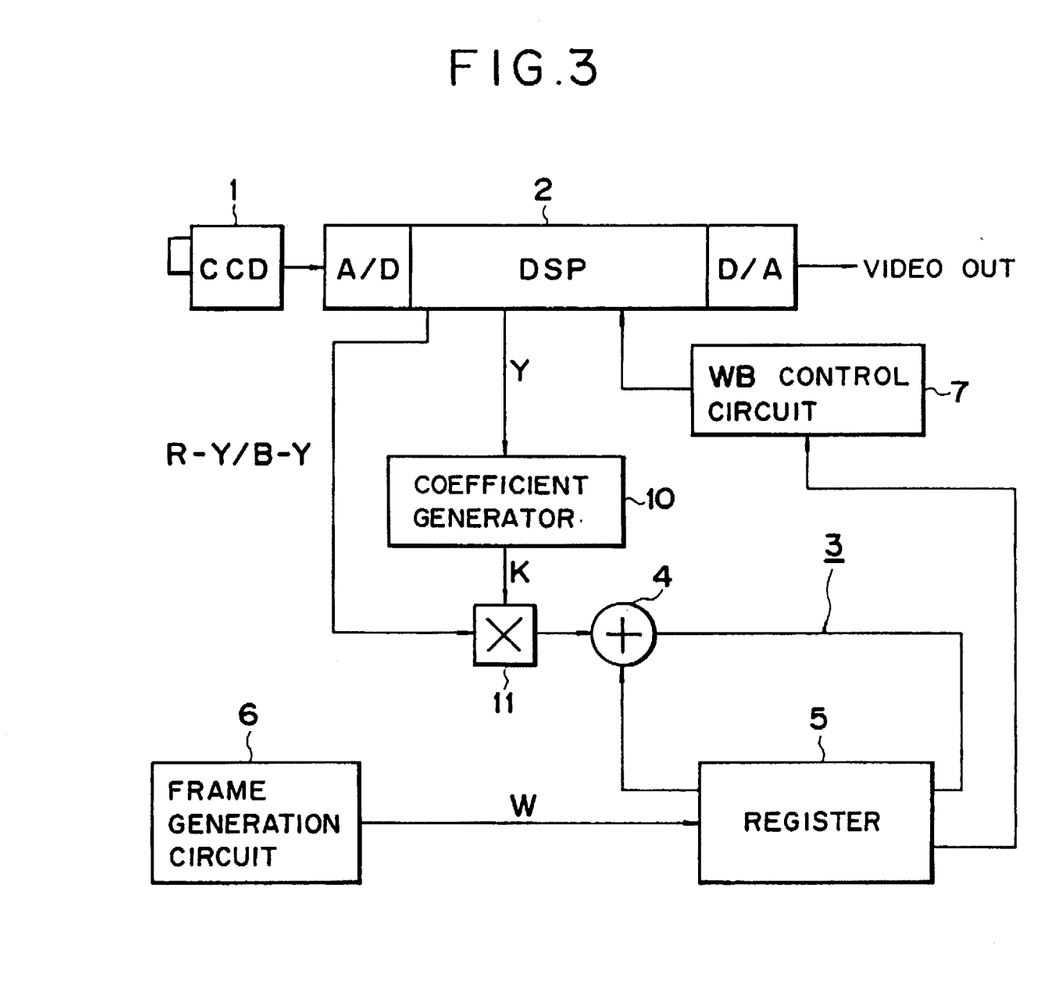
FIG. 3 is a constructional diagram showing an embodiment of the invention.

An embodiment of the present invention will now be described hereinbelow with reference to the drawings. In FIG. 3, the portions corresponding to those in FIG. 1 are designated by the same reference numerals and their overlapped descriptions are omitted here.

In FIG. 3, reference numeral 10 denotes a coefficient generator for generating a coefficient K in accordance with the size of luminance signal Y which is obtained from the DSP 2. and 11 indicates a multiplier to respectively multiply the coefficient K with the color difference signals R-Y and B-Y which are obtained from the DSP 2. A multiplication output of the multiplier 11 is integrated by the integrating circuit 3. It is assumed that two multipliers 11 and two integrating circuits 3 are provided for the color difference signals R-Y and B-Y, respectively.

The operation will now be described.

FIG. 4 shows the relation between the coefficient K of the coefficient generator 10 and the luminance signal Y. In the portion without the signal Y, the coefficient K is set to "0". When the signal Y increases from the portion without the signal Y, the coefficient K also increases. The coefficient K is set to "1" at point A and is set to a predetermined value after that. When the signal increases to a point B, the coefficient K starts to decrease from this point. The coefficient K decreases until the signal Y is set to "0".

In FIG. 3, the color difference signals R-Y and B-Y are respectively multiplied to the coefficient K by the multiplier 11. The multiplication value is integrated by the integrating circuit 3 every frame by the frame signal W from the frame generation circuit 6. Each integration data is supplied to the WB control circuit 7. The WB control circuit 7 sequentially collects the data. After the data of one picture plane was collected, the WB control circuit 7 controls the white balance of the DSP 2 on the basis of the result of the data collection.

According to the above description, the value of the integration data which is derived in the frame in which the luminance is higher than a predetermined upper limit value (B point in FIG. 4) decreases as the luminance rises. The value of the integration data which is obtained in the frame in which the luminance is lower than a predetermined lower limit value (A point in FIG. 4) decreases as the luminance decreases. That is, a ratio of information in the portion of a high luminance, the portion of a low luminance, or the like in which the color component cannot correctly be detected decreases. Therefore, the WB control circuit 7 can use all of the collected data and there is no need to eliminate the data in the improper portions as in the conventional apparatus.

Therefore, the data can be collected in a short time without particularly decreasing the size of frame 9 shown in each of FIGS. 2A to 2D, and the precision is not deteriorated.

According to the embodiment, the coefficient as shown in FIG. 4 is generated in accordance with the luminance signal and the multiplication value of the coefficient and the color difference signal is integrated. There is, consequently, an effect such that the information necessary to control the white balance can be collected in a short time with a high precision without decreasing the size of frame to a value than it is needed.

A specific construction of the frame generation circuit 6 and the like in the above embodiment will now be described.

Figure 5:
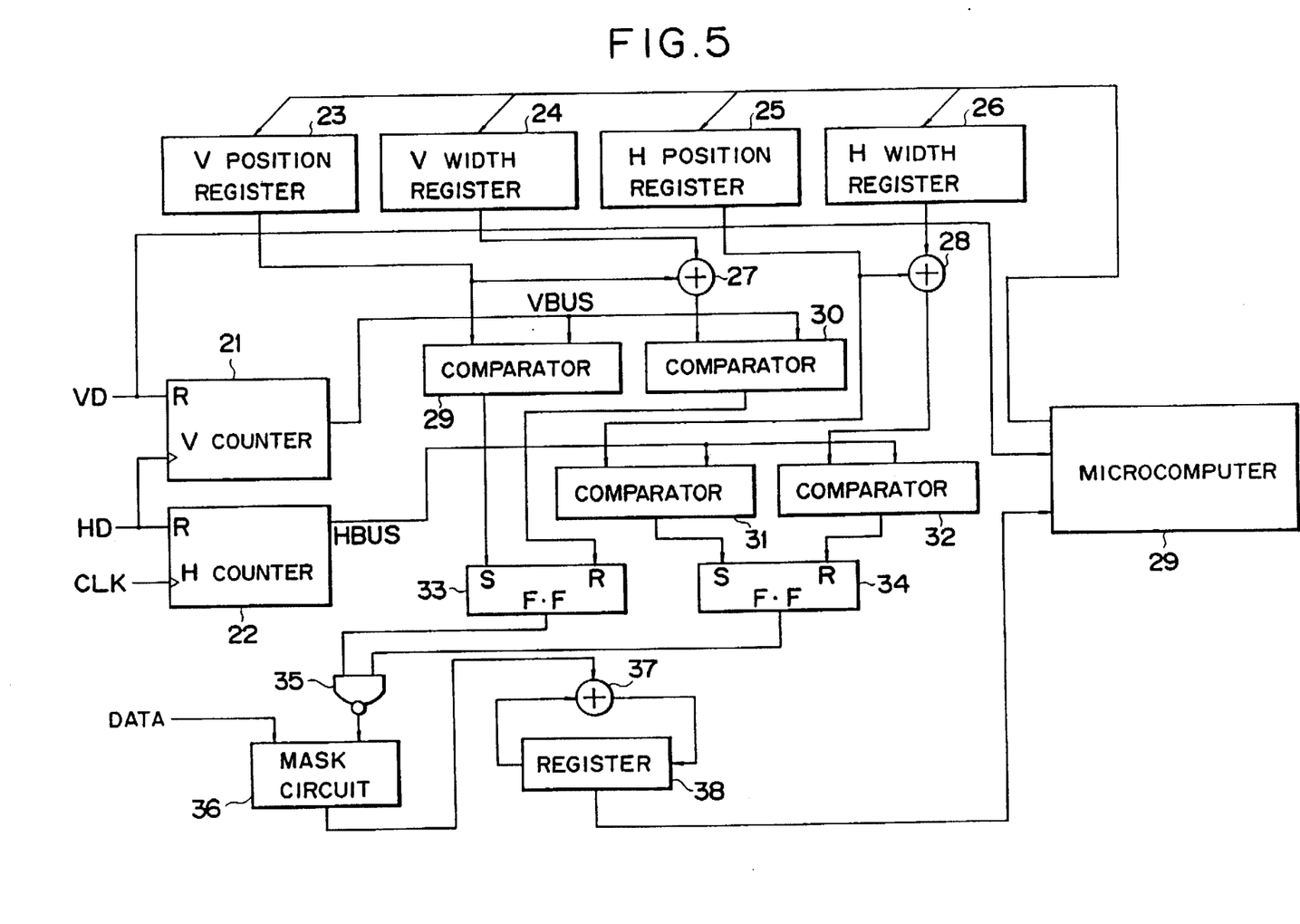
FIG. 5 is a block diagram showing a frame detecting circuit according to another embodiment.

In FIG. 5, reference numeral 21 denotes a V counter for performing a counting operation in the vertical direction by counting a horizontal sync signal HD every vertical sync signal VD. Reference numeral 22 denotes an H counter to execute a counting operation in the horizontal direction by counting a system clock CLK every horizontal sync signal HD.

Reference numeral 23 denotes a vertical position register to write the vertical start position of the detection frame; 24 a vertical width register to write the vertical width of the detection frame; 25 a horizontal position register to write the horizontal start position of the detection frame; and 26 a horizontal width register to write the horizontal width of the detection frame.

Reference numeral 27 denotes an adder for adding the vertical start position in the register 23 and the vertical width in the register 24, thereby obtaining the vertical end position of the detection frame. Reference numeral 28 denotes an adder for adding the horizontal start position in the register 25 and the horizontal width in the register 26, thereby obtaining the horizontal end position of the detection frame.

Reference numeral 29 denotes a comparator for detecting the coincidence between signal VBUS indicative of a count value of the V counter 21 and the vertical start position in the register 23; 30 a comparator to detect the coincidence between the signal VBUS and an addition value of the adder 27; 31 a comparator to detect the coincidence between a signal HBUS indicative of the count value of the H counter 22 and the horizontal start position in the register 25; and 32 a comparator to detect the coincidence between the signal HBUS and an addition value of the adder 28.

Reference numeral 33 denotes a flip-flop which is set by a coincidence output of the comparator 29 and is reset by a coincidence output of the comparator 30; 34 a flip-flop which is set by a coincidence output of the comparator 31 and is reset by a coincidence output of the comparator 32; and 35 an NAND circuit to obtain a frame signal to form a detection frame by outputs of the flip-flops 33 and 34.

Reference numeral 36 denotes a mask circuit to extract a signal in the detection frame from a photographed video signal Data by using the frame signal of the NAND circuit 35; 37 an integration adder to add an output of the mask circuit 36 and an integration output; 38 a register to integrate an output of the adder 37; and 39 a WB control circuit using a microcomputer for setting frame data to the registers 23, 24, 25, and 26 and fetches an integration output from the register 38 every vertical scan period on the basis of the signal VD.

The operation with the above construction will now be described.

In FIG. 5, when the system clock CLK, horizontal sync signal HD, and vertical sync signal VD are supplied to the V counter 21 and H counter 22, the V counter 21 generates A signal generates the signal VBUS of upper six bits among nine bits. The H counter 22 generates the signal HBUS of upper six bits among the ten bits. The frame data of the start position, vertical width, horizontal width, and the like of the detection frame has previously been written into the registers 23 to 26 by the microcomputer 39. The adders 27 and 28 add the values of the vertical and horizontal widths to the values of the start positions in the vertical and horizontal directions, thereby obtaining the end position of the detection frame.

The start and end positions of the detection frame are compared with the signals HBUS and VBUS by the comparators 29 to 32. When they coincide, the comparators send coincidence output signals to the flip-flops 33 and 34. An output signal of each of the flip-flops 33 and 34 is set to the high level when the start position coincides and is set to the low level when the end position coincides. The vertical and horizontal signals are synthesized in the NAND circuit 35, so that a frame signal is produced. The video signal Data is sent to the mask circuit 36. The video signal is directly outputted by the frame signal in case of a region in the detection frame. A zero value is outputted in case of a region out of the detection frame. The signal supplied from the mask circuit 36 is integrated by the integrating circuit constructed by the adder 37 and the register 38. After that, the integrated signal is sent to the microcomputer 39 and is used as information for both of the AWB control and the AE control.

Figure 6:
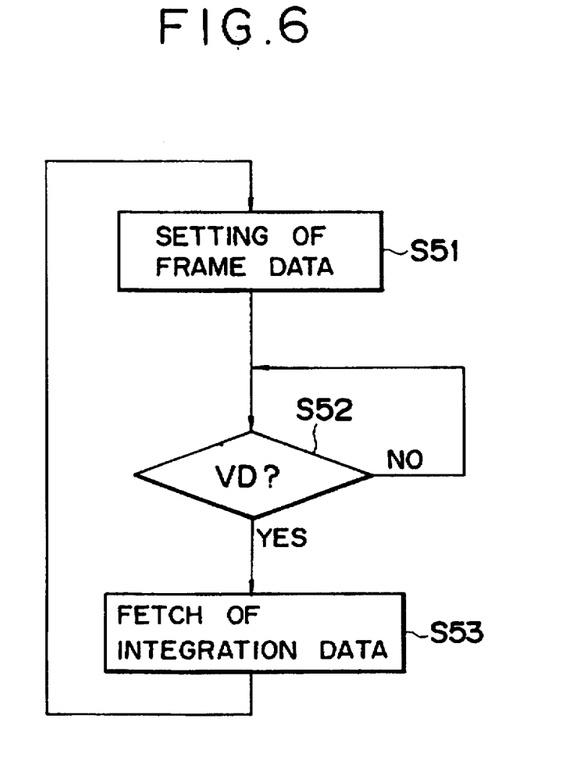
FIG. 6 is a flowchart showing the operation of a microcomputer in FIG. 5.

FIG. 6 is a flowchart showing the operation of the microcomputer 39. In FIG. 6, the frame data is set into the registers 23, 24, 25, and 26 in step S51. In step S52, a check is made to see if the signal VD has arrived or not. When the signal VD is detected, the integration output in the register 38 is fetched in step S53 and the WB control is executed on the basis of the data of the integration output.

Figure 7:
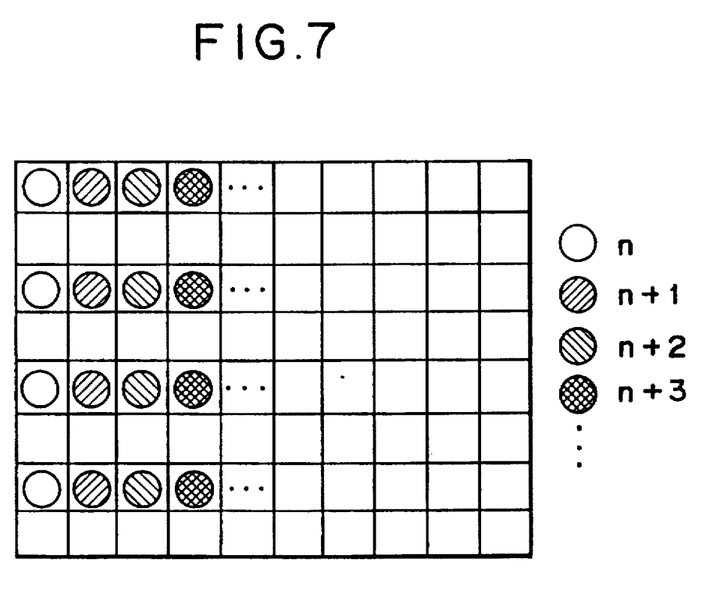
FIG. 7 is a constructional diagram showing a state of positions of detection frames.

FIG. 7 shows an example of the data indicative of the positions of the detection frames in one picture plane which is written into the registers 23, 24, 25, and 26. In the embodiment, frames having a regular pattern such that the frames are arranged in a vertical line or the like as shown in the diagram.

The above circuit constructed as mentioned above has problems such that an amount of information which is extracted is very large and, according to a method of extracting the information once in one vertical scanning period of time, it takes a long time to collect the data of one picture plane, so that a tracing time of the control is too long and it is impossible to trace an object which moves at a high speed, and the like. There is a case where the information to be extracted is one-sided with respect to the time in dependence on the shape, pattern, or the like of an object, so that the accurate control cannot be performed.

In the following embodiment, a plurality of detection frames about one automatic adjustment item are set for one vertical scanning period of time. A plurality of detection frames are set for one vertical scanning period of time, and the positions of the detection frames are irregularly arranged.

According to the embodiment, by setting a plurality of detection frames for one vertical scanning period of time, the time which is required to collect the data of one picture plane is remarkably reduced. The control time is short. It is possible to control with a good tracing performance.

By setting a plurality of detection frames for one vertical scanning period of time and by irregularly arranging the positions of the detection frames, the information which is fetched is averaged and is hardly influenced by an object having patterns with regularity.

Figure 8:
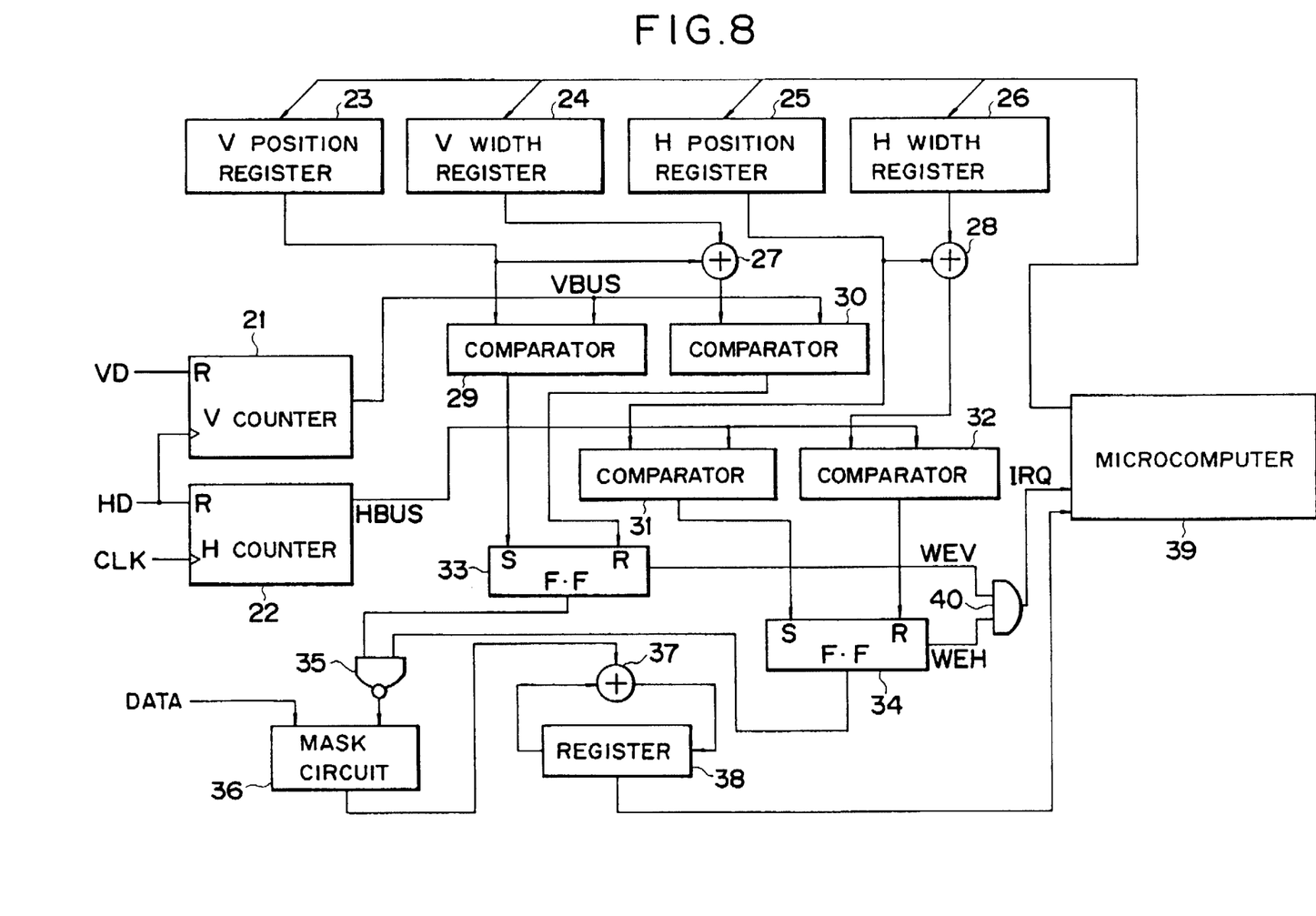
FIG. 8 is a block diagram showing another embodiment.

An embodiment will now be described in detail. In FIG. 8, the portions corresponding to those in FIG. 5 are designated by the same reference numerals and their descriptions are omitted.

In FIG. 8, reference numeral 40 denotes an AND circuit. Frame end signals WEV and WEH from the flip-flops 33 and 34 are supplied to the AND circuit 40. The AND circuit 40 supplies an interruption signal IRQ to the microcomputer 39.

The operation according to the above construction will now be described.

As described above with respect to FIG. 5, the output signal of each of the flip-flops 33 and 34 rises by the coincidence of the frame position and trails by the coincidence of the frame end position. At the same time, the flip-flops 33 and 34 generate the frame end signals WEV and WEH at the frame end position due to the coincidence of the frame position. An AND circuit 40 gets the AND of the signals WEV and WEH which are obtained from the flip-flops 33 and 34 and generates the interruption signal IRQ to the microcomputer 39. As shown in FIGS. 2A to 2D, after the microcomputer 39 received the interruption signal IRQ in step S22, the integration output is fetched from the register 38 in step S23. In step S21, the operation to write the next frame data into the registers 23 to 26 is subsequently executed.

According to the above description, a plurality of detection frames can be formed in one vertical scanning period of time in accordance with the content of the frame data.

The other operations will now be described.

Figure 9:
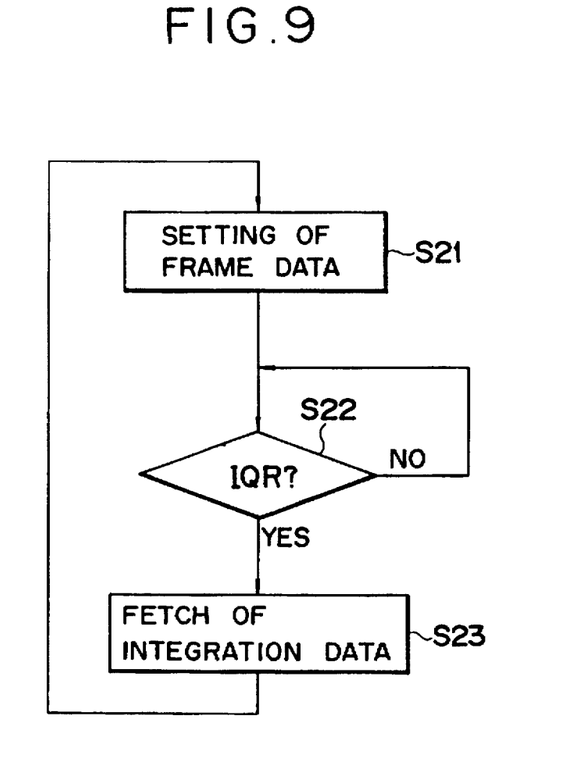
FIG. 9 is a flowchart showing the operation of a microcomputer in FIG. 8.
Figure 10:
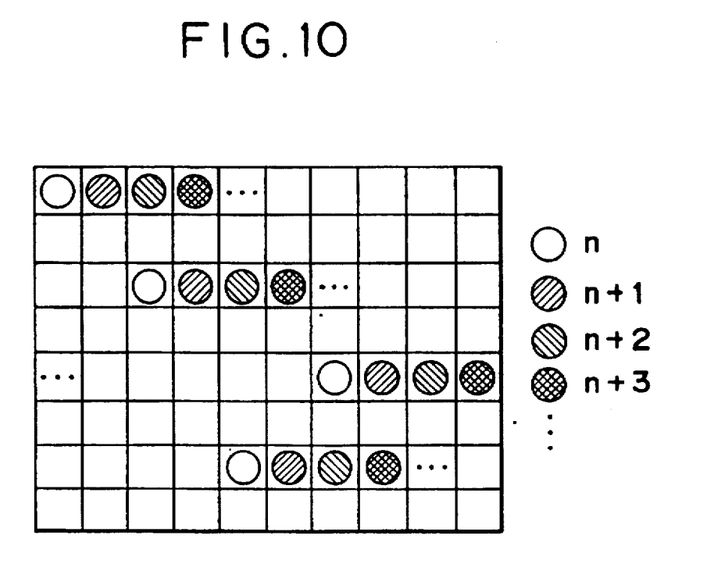
FIG. 10 is a constructional diagram showing a state of positions of detection frames according to the invention.

In the embodiment, when the position of the frame is set by the frame data in step S21 in FIG. 9, as shown in FIG. 10, data is written in a manner such that a plurality of detection frames are irregularly arranged. Therefore, a plurality of detection frames which are obtained for one vertical scanning period of time are irregularly arranged on the photographed picture plane.

As described above, according to the embodiment, after one detection frame was set, by setting the next detection frame, thereby setting a plurality of detection frames in one vertical scanning period of time. Therefore, the time which is required to collect the data of one picture plane is remarkably reduced, the control time is short, and the control with a good tracing ability can be adjusted. On the other hand, since the position of each detection frame is irregularly arranged, there is an effect such that the automatic adjustment of the camera can be performed while being hardly influenced by the object having patterns with regularity, and the like.

Another embodiment showing a specific construction of the embodiment shown in FIG. 3 will now be described in detail.

The embodiment comprises: a time-division circuit to obtain, for example, a dot sequential signal from a plurality of color difference signals separated from the image signal; and a color difference correcting circuit to perform a color difference correction for the time divisional color difference signal.

In the embodiment, the time-divisional multiplexing circuit and subsequent circuits are constructed by only one system and an area of a chip when an IC is formed can be reduced.

Explanation will now be described in detail hereinbelow.

Figure 11:
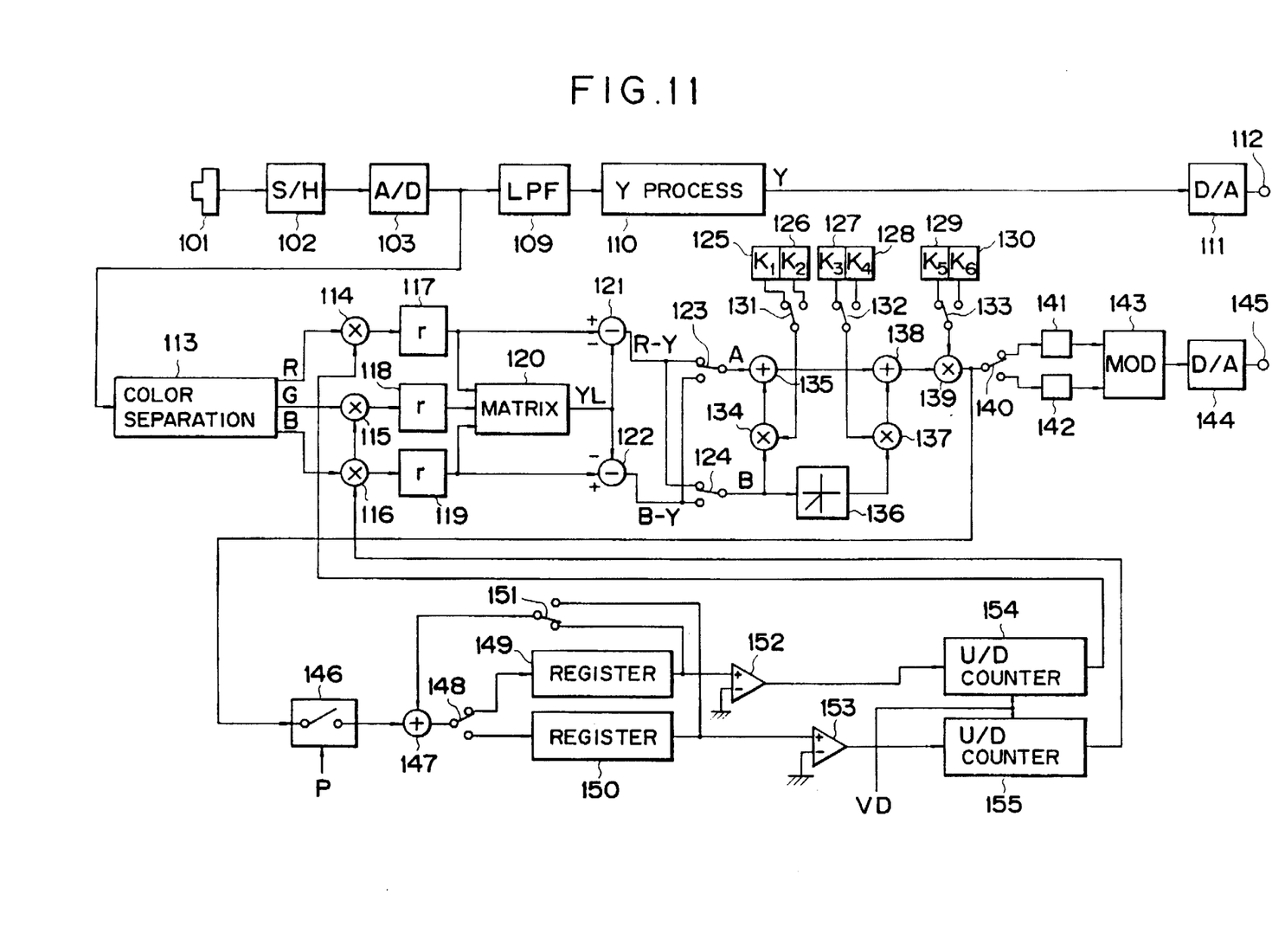
FIG. 11 is a block diagram showing a construction of an embodiment.

FIG. 11 is a diagram showing most preferably a feature of the embodiment. In FIG. 11, reference numeral 101 denotes a color image pickup device such as a CCD or the like having a color filter for every pixel; 102 a sample and hold (S/H) circuit for sampling an output image signal of the color image pickup device 101 at a predetermined period and holding the sampled signals; 103 an A/D converter for converting an output signal of the S/H circuit 102 into digital data; 109 a low pass filter (LPF) for averaging digital image signals; 110 a Y processing circuit to form a luminance signal Y by processing the averaged image signal; 111 a D/A converter to convert the digital luminance signal Y into the analog signal; and 112 an output terminal of the analog luminance signal Y.

Reference numeral 113 denotes a color separation circuit to form three primary color signals of R, G, and B by the digital image signals from the A/D converter 103; 114, 115, and 116 indicate multipliers for multiplying the R, G, and B signals and count values of up/down counters 154 and 155, which will be explained hereinlater, and a predetermined value, thereby obtaining a white balance; 117, 118, and 119 gamma processing circuits for gamma processing output signals of the multipliers 114, 115, and 116; 120 a matrix circuit for matrix calculating the gamma processed signals R, G, and B, thereby forming a luminance signal $Y_L$, 121 a subtracter for performing the subtraction between the gamma processed signal R and the luminance signal $Y_L$, thereby obtaining a color difference signal of the R-Y system; 122 a subtracter for executing the subtraction between the gamma processed signal B and the luminance signal $Y_L$, thereby obtaining a color difference signal of the B-Y system; and 123 and 124 switches for switching output signals (A and B points) of the subtracters 121 and 122 by clocks synchronized with the pixels of the color image pickup device 101 so as to have opposite phases, thereby obtaining dot sequential signals.

Reference numerals 125, 126, 127, 128, 129, and 130 denote registers in which values $K_1$, $K_2$, $K_3$, $K_4$, $K_5$, and $K_6$ indicative of the correction values used in case of executing a color difference correction, which will be explained hereinlater, have been stored. Reference numerals 131, 132, and 133 denote switches for switching the values ($K_1$ and $K_2$), ($K_3$ and $K_4$), and ($K_5$ and $K_6$) synchronously with the switches 123 and 124, respectively; 134 a multiplier to multiply an output of the switch 124 and the value $K_1$ or $K_2$ which is derived from the switch 131; 135 an adder to add an output of the switch 123 and an output of the multiplier 134; 136 a clipping circuit to clip an output of the switch 124 to a negative value or zero; 137 a multiplier to multiply an output of the clipping circuit 136 and the value $K_3$ or $K_4$ which is derived from the switch 132; 138 an adder to add an output of the adder 135 and an output of the multiplier 137; and 139 a multiplier to multiply an output of the adder 138 and the value $K_5$ or $K_6$ which is obtained from the switch 133.

Reference numerals 140 denotes a switch to switch an output of the multiplier 139 every pixel synchronously with the switches 131 to 133; 141 and 142 indicate registers to temporarily hold the signal switched by the switch 140; 143 a modulator to parallel-modulate the dot sequential color difference signals of the registers 141 and 142 by a predetermined subcarrier signal; 144 a D/A converter for converting a digital subcarrier chrominance signal which is obtained from the modulator 143 into the analog signal; and 145 an output terminal of an output signal from the D/A converter 144.

Reference numeral 146 denotes a gate circuit for allowing a signal for a period of time designated by a signal P to designate a region to obtain a white balance in the output of the switch 139 to pass; 147 an adder to which an output signal of the gate circuit 146 is supplied; 148 a switch to switch an output of the adder 147; 149 and 150 registers to store the signal switched by the switch 148; and 151 a switch for switching signals in the registers 149 and 150 and sending to the adder 147. An integrating circuit is constructed by the adder 147, switches 148 and 151, and registers 149 and 150.

Reference numerals 152 and 153 denote comparators to compare outputs of the registers 149 and 150 and a reference potential; and 154 and 155 indicate up/down counters in which the counting direction of the count-up or count-down operation is determined by outputs of the comparators 152 and 153 and which count the vertical sync signal VD. Count values of the counters are sent to the multipilers 114 and 116.

The operation by the above construction will now be described.

The image signal generated from the color image pickup device 101 is sampled and held by the S/H circuit 102 and its output is supplied to the A/D converter 103. The image signal which was converted into the digital data by the A/D converter 103 is supplied to the low pass filter 109 and the color separation circuit 113.

The LPF 109 averages the color difference signals of every pixel which were multiplexed to the image signal derived from the color image pickup device 101 and supplies to the Y processing circuit 110. The Y processing circuit 110 forms the luminance signal Y and, further, executes an outline emphasizing process and a gamma process and, thereafter, supplies the processed signal to the D/A converter 111. The D/A converter 111 converts the digital luminance signal Y into the analog signal and supplies to the output terminal 112.

In the color separation circuit 113, on the other hand, the image signal obtained through the color filters (checkered filter of the complementary colors is used here) adhered every pixel of the color image pickup device 101 is subtracted every pixel, thereby obtaining the chrominance signals of the R-Y system/B-Y system every scanning line. The chrominance signal of the R-Y system and the chrominance signal of the B-Y system are simultaneously obtained by using a 1H (H denotes one horizontal scanning time) delay line and a matrix arithmetic operation is executed, thereby producing signals of three primary colors of R, G, and B. The signals R, G, and B are supplied to the multipliers 114, 115, and 116.

The signals of three primary colors of R, G, and B sent to the multipliers 114, 115, and 116 are multiplied to the count values of the up/down counters 154 and 155 and a predetermined value, thereby obtaining the white balance. The resultant output signals are sent to the gamma processing circuits 117, 118, and 119, respectively. The gamma processed signals R, G, and B are given to the matrix circuit 120. The signal R is given to the subtracter 121. The signal B is added to the subtracter 122. The signals R, G, and B supplied to the matrix circuit 120 are matrix processed and converted into the luminance signal $Y_L$ and is given to negative input terminals of the subtracters 121 and 122.

Due to this, the color difference signal of the R-Y system is derived from the subtracter 121. The color difference signal of the B-Y system is obtained from the subtracter 122. The color difference signals are sent to the switches 123 and 124. Since the switches 123 and 124 are synchronously switched every pixel clock so as to have the opposite phases, the outputs of the subtracters 121 and 122 are extracted so as to have the opposite phases. That is, for a period of time during which the signals of |R-Y|B-Y|R-Y| are extracted at the A point in FIG. 11, the signals of |B-Y|R-Y|B-Y| are extracted at the B point. An output of the switch 123 is supplied to the adder 135. An output of the switch 124 is supplied to the multiplier 134 and the clipping circuit 136.

The values $K_1$ and $K_2$ in the registers 125 and 126 are sent to the switch 131. The switching operation of the switch 131 is switched every pixel synchronously with the switch 124. The output $K_1$ or $K_2$ is given to the multiplier 134. An output of the multiplier 134 is given to the adder 135. As mentioned above, now assuming that the dot-sequential color difference signals R-Y and B-Y selected every pixel by the switch 123 are set to the main system, the dot-sequential color difference signals B-Y and R-Y of the sub system selected by the switch 124 are adjusted by the multiplier 134 on the basis of the coefficient $K_1$ or $K_2$, and after that, the resultant signals are added to the main system by the adder 135.

A circuit constructed by the adder 135, multiplier 134, registers 125 and 126, switch 131, and the like constructs a color correcting circuit called a linear matrix for correcting the color without changing the white balance by changing the sizes of two kinds of color difference signals and adding them. for example. by changing the size of color difference signal of the B-Y system to the color difference signal of the R-Y system and by adding them. With respect to the color difference signal of the B-Y system as well. the size of color difference signal of the R-Y system is also changed and added to the color difference signal of the B-Y system. thereby performing the color correction. The correction amounts in this instance are independently set by the values $K_1$ and $K_2$ stored in the registers 125 and 126. respectively.

An output of the adder 135 is set to the adder 138.

On the other hand. the clipping circuit 136 clips the input signal to zero when it is positive. When the input signal is negative. the clipping circuit 136 directly generates the input signal as it is and supplies to the multiplier 137.

The values $K_3$ and $K_4$ in the registers 127 and 128 are sent to the switch 132. The switching operation of the switch 132 is switched every pixel synchronously with the switch 131. An output of the switch 132 is added to the signal of the multiplier 137. An output of the multiplier 137 is given to the adder 138.

The color difference signal of the main system which had been selected every pixel by the switch 123 and was subjected to the linear matrix correction by another color difference signal is added by the adder 138 to the signal in which the color difference signal of the sub system selected by the switch 124 had been clipped to only either the negative value or zero by the clipping circuit 136 and was adjusted by the multiplier 137.

The above circuit constructs a color correcting circuit called a clip matrix for correcting. for example. the color difference signal of the R-Y system by using a negative portion of another color difference signal of the B-Y system. In this instance. the correction amounts are independently set by the values $K_3$ and $K_4$ stored in the registers 127 and 128. respectively.

The output of the adder 138 is given to the adder 139.

The values $K_5$ and $K_6$ in the registers 129 and 130 are sent to the switch 133. The switching operation of the switch 133 is switched every pixel synchronously with the switch 132 and its output is supplied to the multiplier 139.

The two kinds of corrected color difference signals of every pixel which are generated from the adder 138 are adjusted to the proper color difference levels by the multiplier 139 and are given to the switch 140. The switching operation of the switch 140 is switched every pixel synchronously with the switch 133. The switch 140 selects two kinds of color difference signals and sets the R-Y color difference signal into the register 141. while the B-Y color difference signal is set into the register 142.

The two kinds of color difference signals reproduced as mentioned above are given to the modulator 143. The modulator 143 parallel-modulates the color subcarrier signal by the two color difference signals given. thereby forming a subcarrier chrominance signal and supplying it to the D/A converter 144. The D/A converter 144 converts the digital subcarrier chrominance signal into the analog signal and supplies it to the output terminal 145.

Although the example in which another color difference signal of the color difference signals which are alternately supplied from the multiplier 139 is pre-interpolated has been described here. there is also a method of correcting the color difference signal from the data before and after the target data by using an interpolation filter.

Figure 12:
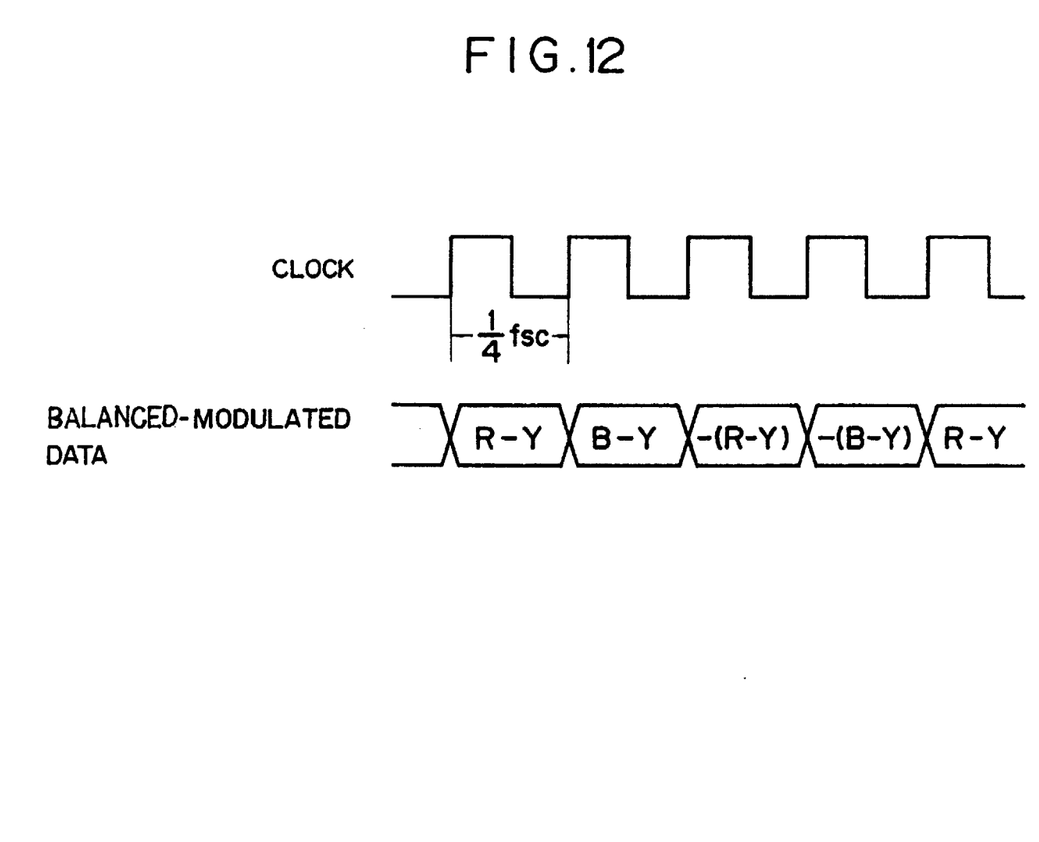
FIG. 12 is a timing chart showing an arrangement of parallel-modulated data in FIG. 11.

So long as the sampling frequency of the pixel is four times as high as a frequency $f_{sc}$ of the color subcarrier signal.

by providing continuity to the selection of the pixel. the data can be also directly used as the parallel-modulated data as shown in FIG. 12.

The output of the multiplier 139 is given to the gate circuit 146. The gate circuit 146 is turned on at the position P at which the operator wants to obtain the white balance on the screen. An output of the gate circuit 146 is given to the adder 147. Another input of the adder 147 is connected to outputs in the registers 149 and 150 through the switch 151. An output of the adder 147 is connected to input terminals of the registers 149 and 150 through the switch 148.

The switching operations of the switches 151 and 148 are switched every pixel synchronously with the switch 140. The integration value of the R-Y color difference signal is stored in the register 149. The integration value of the B-Y color difference signal is stored in the register 150.

The register 149 integrates the R-Y color difference signal in the portion in which the gate circuit 146 was turned on and supplies the result of the integration to the comparator 152. The comparator 152 discriminates whether the result of the integration of the register 149 indicates a positive or negative value. Then. the comparator 152 supplies a siganl indicative of the comparison result as a binary value of 0 or 1 to an up/down terminal of the up/down counter 154. One vertical sync signal VD is given as a clock pulse every field to a clock terminal of the up/down counter 154. The up/down counter 154 executes the counting up/down operation of −1 or +1 in accordance with the result indicating whether the integration result of the gated portion of the R-Y color difference signal of the relevant field indicates positive or negative. The count value of the up/down counter 154 is sent to the multiplier 114. By varying the R gain. the white balance in the R-Y axial direction is matched.

The register 150 integrates the B-Y color difference signal of the signal which was gated by the gate circuit 146. The result of the integration is compared by the comparator 153. The count value of the up/down counter 155 is increased or decreased in accordance with the result of the comparison. The resultant count value is sent to the multiplier 116. By varying the B gain. the white balance in the B-Y axial direction is matched. A predetermined value is multiplied by the multiplier 115.

According to the embodiment as described above. in a circuit in which a plurality of color difference signals are produced from the image signal derived from the color image pickup device 101 and are subjected to the color difference correction such as linear matrix. clip matrix. or the like and the corrected signals are generated and the white balance is matched by using the integration value of the color difference signals. a plurality of color difference signals are converted into the dot-sequential signals and are multiplexed and the processes of the subsequent circuits at the post stage are executed by using the signal line of one system. Consequently. a wiring region or the like of the multiplier and adder which need large areas when an IC is realized can be reduced.

Although the band in which the color difference signals are obtained is reduced to ½ or less as compared with the conventional one due to the execution of the process to obtain the dot-sequential signals. it is sufficient to set the band of the color difference signals to a value within a range of about 0.5 to 1.5 MHz. In the embodiment. it is sufficient to use the color image pickup device 101 of a relatively small number of pixels such that the number of what are called effective pixels is equal to 250000. Although a large number of switches are used in place of the decrease in number of pixels, since the switch can be fundamentally constructed by a small AND/OR gates, the chip area can remarkably reduced owing to the use of such small gates.

At the same time when the signals of the main system of |R-Y|B-Y|R-Y| are being extracted at the point A in FIG. 11, the signals of the correcting system (sub system) of |B-Y|R-Y|B-Y| of the phase opposite to that at the point A are extracted and the color difference matrix correction is executed. Therefore, there are the following effects when the color difference correction is executed.

(1) The circuit is simplified.

(2) The delay time which results in an increase in circuit scale doesn't increase.

(3) There is no need to insert delay means for adjusting the times between the main system and the correcting system.

(4) A deterioration of the picture quality such as color deviation or the like due to the deviation of the sampling times between the main system and the correcting system doesn't occur.

According to the embodiment as described above, after the plurality of color difference signals separated from the image signal was time-division multiplexed by the dot-sequential process or the like, the multiplexed signal is outputted through the color difference correcting circuit. On the other hand, the plurality of dot-sequential color difference signals which passed through the color difference correcting circuit are respectively integrated and the white balance control signal is formed in accordance with the results of the integration. Consequently, it is sufficient to use only one system of the color difference correcting circuit. The chip area when an IC is formed can be reduced. Thus, the costs of the IC circuit can be reduced. The electric power consumption can be decreased.

What is claimed is:

1. A white balance control apparatus comprising:
   coefficient generating means for generating a coefficient so as to decrease as the level of a luminance signal, which is obtained by processing an input image signal, increases while exceeding a predetermined upper limit value and so as to decrease as such a level decreases than a predetermined lower limit value;
   multiplying means for multiplying color difference signals obtained by processing the input image signal and the coefficient generated by said coefficient generating means;
   integrating means for integrating multiplication outputs of said multiplying means every plurality of regions which have been predetermined on a screen; and
   a white balance control circuit to control a white balance on the screen by using integration outputs of the integrating means.

2. An apparatus according to claim 1, wherein said plurality of regions are irregularly arranged.

3. An image pickup apparatus comprising:
   coefficient generating means for generating a coefficient which decreases when the level of a luminance signal exceeds a predetermined limit;
   multiplying means for multiplying color difference signals obtained by processing the input image signal and the coefficient generated by said coefficient generating means;
   integrating means for integrating multiplication outputs of said multiplying means every plurality of regions which have been predetermined on a screen; and
   a white balance control circuit to control a white balance on the screen by using integration outputs of the integrating means.

4. An apparatus according to claim 3, wherein said plurality of regions are irregularly arranged.

* * * * *